United States Patent

Tonelli et al.

[11] Patent Number: 6,080,316
[45] Date of Patent: Jun. 27, 2000

[54] HIGH RESISTIVITY WATER PRODUCTION

[76] Inventors: Anthony A. Tonelli; Eric Harrison, both of Zenon Environmental, Inc. 845 Harrington Court, Burlington, Ontario, Canada, L7N 3P3

[21] Appl. No.: 08/808,993

[22] Filed: Mar. 3, 1997

[51] Int. Cl.[7] .................................................. B01D 61/00
[52] U.S. Cl. .......................... 210/652; 210/638; 210/900; 210/639; 210/195.2; 210/87; 210/85; 210/641; 210/257.2
[58] Field of Search ..................................... 210/651, 652, 210/900, 638, 639, 257.2, 195.2, 668, 87, 641, 85

[56] References Cited

U.S. PATENT DOCUMENTS

| | | | |
|---|---|---|---|
| 3,462,364 | 8/1969 | Carlsory | 210/638 |
| 3,474,032 | 10/1969 | King | 210/87 |
| 4,495,067 | 1/1985 | Klein et al. | 210/87 |
| 4,528,093 | 7/1985 | Winer | 210/96.2 |
| 4,574,049 | 3/1986 | Pittner | 210/639 |
| 4,587,518 | 5/1986 | King | 210/85 |
| 4,772,385 | 9/1988 | Yamada et al. | 210/87 |
| 4,830,757 | 5/1989 | Lynch et al. | 210/85 |
| 4,897,091 | 1/1990 | Pasternak et al. | 55/16 |
| 4,937,557 | 6/1990 | Tucci | 340/603 |
| 5,024,766 | 6/1991 | Mahmud | 210/668 |
| 5,061,374 | 10/1991 | Lewis | 210/638 |
| 5,078,755 | 1/1992 | Tozawa et al. | 55/16 |
| 5,106,754 | 4/1992 | Steele et al. | 436/146 |
| 5,116,507 | 5/1992 | Ebbins et al. | 210/639 |
| 5,116,509 | 5/1992 | White | 210/644 |
| 5,156,739 | 10/1992 | Dawson et al. | 210/321.8 |
| 5,250,183 | 10/1993 | Sawada et al. | 210/652 |
| 5,254,143 | 10/1993 | Anazawa et al. | 95/46 |
| 5,306,427 | 4/1994 | Xu | 210/640 |
| 5,338,456 | 8/1994 | Stivers | 210/652 |
| 5,340,468 | 8/1994 | Hawthorne et al. | 210/96.1 |
| 5,362,383 | 11/1994 | Zimmerman et al. | 210/85 |
| 5,396,178 | 3/1995 | Rybarski | 324/439 |
| 5,413,763 | 5/1995 | Jeffers | 422/80 |
| 5,651,894 | 7/1997 | Boyce et al. | 210/652 |
| 5,766,479 | 6/1998 | Collentro et al. | 210/639 |

FOREIGN PATENT DOCUMENTS

| | | |
|---|---|---|
| 22802 | 1/1990 | Japan . |
| 422490 | 1/1992 | Japan . |
| 4176303 | 6/1992 | Japan . |

*Primary Examiner*—Ana Fortuna
*Attorney, Agent, or Firm*—Andrew Alexander

[57] ABSTRACT

An adaptive control method for producing high purity water, the method having the ability to produce high purity water on a continuous basis having a resistivity in the range of 0.8 to 4 megohm-cm. The method comprises the steps of providing a feedwater to be purified and providing a first reverse osmosis unit having a first high pressure side and a first low pressure side and having a first permeate produced at the first low pressure side. The pH of the feedwater to be introduced to the high pressure of the first reverse osmosis unit is monitored before introducing the feedwater to the high pressure side of the first reverse osmosis unit. A second reverse osmosis unit is provided having a second high pressure side and a second low pressure side for producing high purity product water. The first permeate from the first reverse osmosis unit is passed to the high pressure side of the second reverse osmosis unit and the resistance of the product water produced at the second low pressure side of the second reverse osmosis unit is measured to provide a resistance measurement. The resistance measurement is relayed to a programmable logic controller where it is compared to previous resistance measurements to provide a comparison. In response to the comparison, the pH of the feed water is either maintained or is changed upwardly or downwardly to produce high purity water having the desired resistivity.

30 Claims, 4 Drawing Sheets

HIGH RESISTIVITY WATER PRODUCTION

BACKGROUND OF THE INVENTION

This invention relates to production of high purity product water, and more particularly it relates to a method and apparatus for producing product water having a high level of electrical resistivity.

One of the problems in producing high purity product water in a double pass reverse osmosis is that it is difficult to reject gases such as carbon dioxide and/or ammonia because such gases are not easily removed by reverse osmosis membranes. The carbon dioxide and ammonia gas pass through the reverse osmosis system and reestablish an equilibrium in the product water and adversely affect product water resistivity. However, merely controlling the gases in the feedwater does not ensure high resistivity water.

The pH of feedwater to a double pass reverse osmosis is often controlled to provide high resistivity water. However, often, a pH range of feedwater that produces high resistivity product water in one instance may not always produce high resistivity product water in another instance. That is, pH of feedwater to the first pass reverse osmosis does not always provide a control that produces high resistivity product water.

The presence of total alkalinity due mainly to bicarbonate, smaller amounts of carbonate, with small contributions by other ions and of carbon dioxide in the feedwater is responsible for significant changes in apparent rejection of salts and thus in the conductivity of product water from a double pass reverse osmosis system. As noted, reverse osmosis membranes are transparent to dissolved gases. Thus, $CO_2$ present in the feed side of the first pass membrane passes through the membrane to the interpass while bicarbonate and carbonate comprising total alkalinity is mostly rejected along with other anions and cations. This results in a change in the total alkalinity:$CO_2$ ratio, a loss of buffering capacity and causes a drop in pH from feed to interpass or permeate from the first membrane in a double pass reverse osmosis system. The same process is repeated from the interpass to the second pass product. The resulting change in the interpass pH can have the result of moving the interpass pH away from the pH which results in high resistivity product water from the second pass reverse osmosis unit. Thus, setting the pH of the feedwater to a double pass reverse osmosis does not always result in high resistivity product water.

In addition, when a particular pH is chosen for producing high resistivity water from a particular feedwater, changes in the feedwater composition, e.g., alkalinity, can render the chosen pH not optimum. Thus, lower quality product water results even though the feedwater has been maintained within a narrow pH range which was, at one time, thought to be optimum. Further, it will be appreciated that different membranes have the capacity to reject different ions to a lesser or greater extent. That is, some membranes reject anions better than cations and vice versa. When there is preferential rejection, there can be leakage of the other or opposite ion. pH of the feedwater has a large impact on the capacity of the particular membrane to reject the particular anion or cation. However, any membrane's performance can vary in a systematic way with pH to reach a peak value for rejection, and thereafter its performance declines on either side of an optimum pH.

This concept is illustrated in FIG. 3 where A and B denote the highest resistivity for a given pH value. On either side of these points, resistivity declines. FIG. 3 also illustrates that different pH values can result in the same quality product water. However, on either side of the pH value, product quality declines. A can represent TDS and, B high alkalinity. Further, the process is complicated by membrane selection. The negatively charged membrane of Fluid Systems Inc., referred to by the tradename HRRX membrane, operates in a pH range of 6.5 to 8 with a 99.4% rejection, while Toray's positively charged membrane, having the designation SU91OS, operates at a pH of 9 to 9.5 with a 99.5% rejection. The lower pH is better for removing ammonia and the higher pH is better for removing carbon dioxide. Thus, it will be seen that there is a great need for a process which can be tuned to the system, including feedwater and the use of different membranes, and which will consistently produce high resistivity water on a continuous basis, even with changing composition of the feedwater.

Attempts at removing carbon dioxide to provide high resistivity water in the past have only been partially successful and often end up further contaminating the water. For example, U.S. Pat. No. 4,574,049 discloses a process for removing carbon dioxide and other impurities from a water supply using double pass reverse osmosis membranes. The process includes providing a first reverse osmosis until having an inlet, a product outlet and a brine outlet; providing a second reverse osmosis unit having an inlet, a product outlet and a brine outlet; locating the second reverse osmosis unit downstream of the first reverse osmosis unit with the product outlet of the first reverse osmosis unit being coupled to the inlet of second reverse osmosis unit; providing water to be purified to the inlet of first reverse osmosis unit; treating the product from the reverse osmosis unit at a location upstream of second reverse osmosis unit with a chemical treatment agent comprising a solution having a pH that exceeds 7 to reduce carbon dioxide concentration of the product by chemical conversion and to ionize certain otherwise difficult to remove chemicals; and directing the product from second reverse osmosis unit toward a point of use or storage for purified water.

However, this process which normally uses sodium hydroxide for increasing the pH results in the addition of sodium which, because of its small ionic radius, is difficult to remove by subsequent membranes. Further, the addition of sodium hydroxide has another disadvantage in that the series of reactions removing carbon dioxide are relatively slow when compared to reverse osmosis unit contact time. Thus, the effectiveness of the operation is limited by the sodium hydroxide reactions, and further, this process does not remove ammonia.

U.S. Pat. No. 5,338,456 discloses a water purification process for removing dissolved solids of the type that are normally present in a municipal or similar water supply. The process uses a forced draft decarbonator having an inlet and a product outlet, a vacuum degasifier having an inlet, a product outlet and a water level sensor, and a reverse osmosis unit having an inlet, a product outlet and a brine outlet. The vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced draft decarbonator at a predetermined rate. According to the invention, the rate at which water to be purified is provided to the inlet of the forced draft decarbonator is a functions of a predetermined water level in the vacuum degasifier.

Japanese Patent 4-22490 discloses a pre-stage reverse osmosis membrane module, a post-stage reverse osmosis membrane module and a hydrophobic porous membrane module, to which an aqueous alkali solution circulating line is attached in the permeate side. That is, Japanese Patent 4-22490 utilizes an alkali solution in the permeate side to remove dissolved carbon dioxide by chemical reaction. The hydrophobic porous membrane module is placed between the pre-stage module and the post-stage module and has pores capable of permeating only gases. An inert gas blowing pipe is installed to the alkali aqueous solution circulating line.

Japanese Patent 2-2802 discloses reverse osmosis separator membrane module and degassing membrane module arranged in treating water line in series. The degassing membrane is formed by a porous supporter layer and high molecular homogeneous layer or minute layer arranged on the supportor layer. Oxygen separating. coefficient of the degassing membrane is not less than 1.3.

U.S. Pat. No. 4,897,091 discloses that gases such as carbon dioxide may be separated from rich liquor (such as methanol containing carbon dioxide) by passage of gas through a membrane which is the reaction product of (i) a polyamine and (ii) a polyisocyanate or a poly (carbonyl chloride).

U.S. Pat. No. 5,078,755 discloses removing dissolved gas from liquid, which comprises bringing the liquid containing the gas dissolved therein into contact with a membrane, thereby causing the dissolved gas to selectively permeate the membrane. The membrane is a permselective, composite membrane composed of a porous support and a nonporous, active membrane of a synthetic resin formed on the porous support, or is a permeable membrane having such characteristics that the nitrogen gas permeation rate at 30° C. is in the range from 7×10−4 to 2×102 Nm3m2·h·atom and that the amount of permeated stream is 100 g/m$^2$·h or less when 20° C. water is supplied to the membrane under atmospheric pressure while maintaining the pressure on its permeate side at 40 mm Hg.

U.S. Pat. No. 5,106,754 discloses that total organic carbon (TOC) and total inorganic carbon (TIC) monitoring of water is useful in determining the water quality. Conventional TOC and TIC monitoring techniques are not zero gravity compatible. The addition of microporous hydrophobic bladders in combination with a non-dispersive infrared analyzer allow for a two-phase, liquid and gas, zero gravity compatible TOC monitoring technique.

U.S. Pat. No. 5,116,507 discloses a method of treating an aqueous liquor, such as effluent liquor formed during coal gasification. The method comprises subjecting the liquor to dephenolation and ammonia stripping treatment to remove phenolic compounds and "free" ammonia from the liquor and then subjecting the resulting liquor, which still contains ammonium compounds and thus "fixed" ammonia, to reverse osmosis treatment to produce a permeate which is substantially free from impurities, including fixed ammonia.

U.S. Pat. No. 5,250,183 discloses an apparatus for manufacturing ultra-pure water, characterized in that a decarbonator/degassor and a reverse osmosis equipment for pretreatment of supply water are installed in the upper stream of a multiple effect evaporator.

U.S. Pat. No. 5,254,143 discloses a diaphragm for gas liquid contact comprising a membrane having two surfaces, at least one surface of the membrane is hydrophilic and surfaces of micropores present in the membrane are hydrophobic. The diaphragm is used in contact apparatus in which a liquid is contacted with the hydrophilic surface of the membrane and a gas is contacted with the other surface.

U.S. Pat. No. 5,306,427 discloses a process for the separation of one or more, more permeable components from one or more, less permeable components in a feed stream. The process suggests two membrane separation stages in series wherein the feed is introduced into the low pressure side of the first stage, the permeate stream from the first stage is compressed and introduced into the high pressure side of the second stage and wherein the non-permeate stream from the second stage is recycled to the high pressure side of the first stage.

U.S. Pat. No. 5,413,763 discloses a method and apparatus for the measurement of the total organic carbon (TOC) content of a liquid. The inorganic carbon in the liquid is converted into carbon dioxide and removed from it. At the same time, oxygen is added to the liquid. The liquid is then exposed to ultraviolet radiation and the organic carbon thereby oxidized.

Japanese Patent 4-176303 discloses a gas-permeable membrane module containing a hollow fiber-shaped hydrophobic gas-permeable membrane used to remove the gas dissolved in a liquid. The liquid is supplied from an inlet, passed through the inside of the membrane from the membrane opening and sent to the other end of the membrane. A carrier gas is introduced from an outlet, passed around the bundle of the membranes and discharged from an outlet. The outlet is connected under these conditions to a vacuum source such as a vacuum pump, hence the gas dissolved in the liquid permeates through the membrane to the outside, and degasification is performed with high efficiency.

In U.S. Pat. No. 5,156,739, it is disclosed that water to be purified and degassed is passed through a reverse osmosis step from which a pure water stream and a high pressure waste water stream are produced. The high pressure waste water is passed through an eductor to produce a vacuum. The pure water stream is passed into a first volume of a degassifier and the vacuum is directed to a second volume of the degassifier. The first and second volume of the degassifier are separated by a hydrophobic membrane.

In spite of these prior processes, there is still a great need for an improved process which will produce high purity or high resistivity water on a continuous basis.

SUMMARY OF THE INVENTION

It is an object of this invention to provide an improved process for producing high purity water, for example, having a resistivity of 0.8 megohm-cm or greater.

It is another object of the invention to provide an improved control process for producing high purity water by utilizing product resistivity to provide pH control of feedwater.

Yet, it is another object of the present invention to use double pass reverse osmosis having product water resistivity monitored to control the pH of feedwater.

And yet, it is another object of the invention to provide an improved process for producing high purity water on a continuous basis using a programmable logic controller to compare high purity water resistivity measurements and control feedwater pH based on product water resistivity.

These and other objects will become apparent from a reading of the specification and claims appended hereto.

In accordance with these objects, there is provided an adaptive control method for producing high purity water, the method having the ability to produce high purity water on a continuous basis, the water having a resistivity in the range of 0.8 to 4 megohm-cm. The method comprises the steps of providing a feedwater to be purified and providing a first reverse osmosis unit having a first high pressure side and a first low pressure side and having a first permeate produced at the first low pressure side. The pH of the feedwater is monitored before introducing the feedwater to the high pressure side of the first reverse osmosis. A second reverse osmosis is provided having a second high pressure side and a second low pressure side for producing high purity product water. The first permeate from the first reverse osmosis is passed to the high pressure side of the second reverse osmosis and the electrical resistance of the product water produced at the second low pressure side of the second reverse osmosis is measured to provide a resistance measurement. The resistance measurement is relayed to a programmable logic controller where it is compared to previous resistance measurements to provide a comparison. In response to the comparison, the pH of the feed water is either maintained or is changed upwardly or downwardly to produce high purity water having the desired resistivity.

DETAILED DESCRIPTION OF THE PREFERRED EMBODIMENTS

Figure 1:
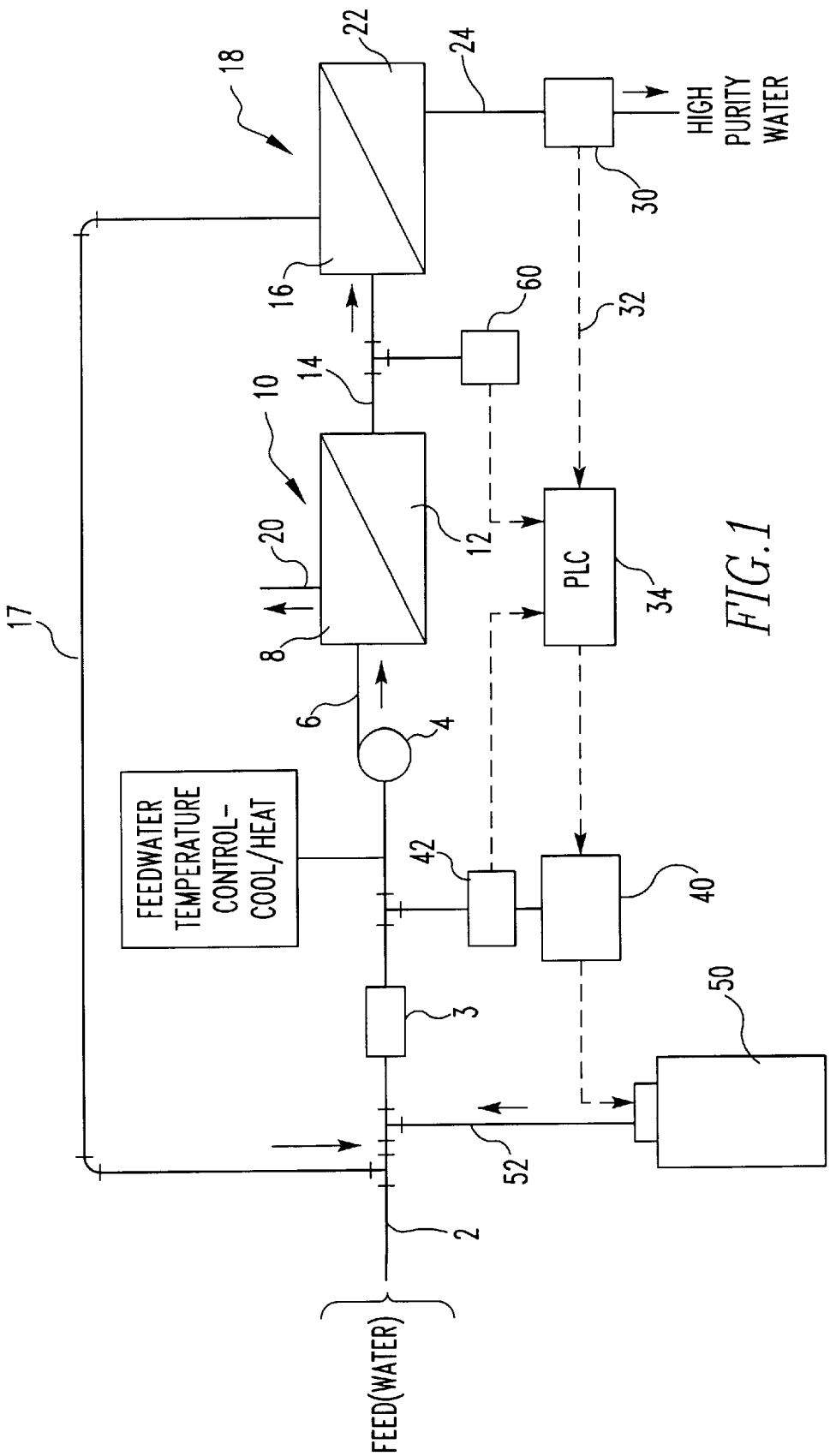
FIG. 1 is a schematic representation of the process of the invention showing a pH control loop for double pass reverse osmosis modules for producing high purity water.

In the present invention, feedwater is introduced to line 2. Pump 4 transfers feedwater along line 6 to high pressure side 8 of first reverse osmosis unit 10. Prior to being introduced to high pressure side 8, the feedwater is subjected to a number of pretreatments depending to some extent on the quality of the initial feedwater. Further, prior to entering high pressure side 8, the pH of the feedwater is carefully controlled in response to resistivity of the product water obtained from the system, as will be explained herein. Permeate from low pressure side 12 of reverse osmosis unit 10 is transferred along line 14 to high pressure side 16 of second reverse osmosis unit 18. Retentate from reverse osmosis unit 10 is discarded or removed along line 20. Because adjustments are made to the pH of the feedwater in response to product resistivity, normally there is no need to chemically adjust the permeate emanating from low pressure side 12 of first reverse osmosis unit 10. It will be appreciated that chemical additions to the interpass permeate between reverse osmosis unit 10 and reverse osmosis unit 18 are generally undesirable because such additions can add ions which are difficult to remove in the second reverse osmosis unit, compromising the quality of the final product. High purity water is removed from low pressure side 22 of reverse osmosis unit 18 along line 24. Retentate from reverse osmosis unit 18 can be removed along line 17 to feedwater line 2 as indicated.

For purposes of producing high purity or high resistivity water, a resistivity monitor 30 is placed in line 24 to monitor the quality of the water leaving or emanating as permeate from second reverse osmosis unit 18 and the resistivity of the water is measured. The resistivity measurement is then relayed to a programmable logic controller 34 along line 32. The programmable logic controller is set up to compare the present resistivity measurement to the previous resistivity measurement. The programmable logic controller then determines whether the pH of the feedwater should remain the same or should be adjusted upwardly or downwardly to maintain or improve the resistivity of the product water. If the determination is made by programmable logic controller 34 that the pH of the feedwater should be adjusted upwardly, then a signal is sent to pH controller 40 which in turn signals for more caustic soda, for example, to be introduced from container 50 along line 52 to feedwater line 2. This adjusts the pH of the feedwater upwards as required by the resistivity measurement of the product water from reverse osmosis unit 18. Static mixer 3 ensures that the caustic soda is uniformly distributed in the feedwater prior to measuring the pH of feedwater by pH meter 42 and transferring feedwater to high pressure side 8 of reverse osmosis unit 10.

It will be appreciated that programmable logic controller 34 can be programmed to calculate the amount of caustic soda to be introduced to the feedwater. If caustic soda is already being introduced, programmable logic controller 34 can be programmed to calculate the additional amount of caustic soda to be introduced to the feedwater. The pH of the feedwater can be monitored by pH meter 42 and the feedwater pH relayed to programmable logic controller 34 for determining the amount of caustic soda to be added. Continuous monitoring of feedwater pH by meter 42 provides programmable logic controller 34 with information respecting the feedwater and permits determination by programmable logic controller 34 whether feedwater pH is increasing or decreasing.

Programmable logic controller 34 can be programmed to maintain the resistivity of the product water within a given range or it can be programmed to improve the resistivity continually within the range. That is, if the last change in feedwater pH was an increase in pH of 0.1, for example, and this improved resistivity, programmable logic controller 34 can be programmed to increase the pH again. The amount of increase would normally be smaller than the previous increase in pH. This function can be continued to obtain the highest purity water. However, these values must be maintained within controlled ranges. That is, additional amounts of caustic soda can act to decrease resistivity. However, it should be understood that if the resistivity of the product water meets the desired value, no adjustment of pH would be necessary. Further, if caustic is being added, then a lesser amount is added if it is desired to lower the pH.

In operation, the programmable logic controller makes the comparison, using stored values in memory, and for example a logic table (or any other suitable control algorithm), and decides whether pH should increase or decrease, and then sends a signal to the pH controller, to raise or lower the set-point on the pH controller. The basis for resetting the set-point can be an adjustable incremental change in the set-point value. During normal operation, steps or changes of as little as 0.02 pH units can typically be used. Implementation of the change is handled by the pH controller, which can be any suitable stand-alone PID or similar controller or can also be written in programmable logic controller code.

In the subject invention, it is not the pH of the feedwater than determines the quality of water obtained from the system. Instead, it is the resistivity of the product water or permeate from the second reverse osmosis and its trend with time that determines or provides control for producing high purity water. Thus, for example, normally there is no need for interpass, i.e., between reverse osmosis units 10 and 18, additions of chemicals to change pH, for example, of the interpass or permeate from reverse osmosis unit 10, if the pH of the feedwater is controlled based on product water resistivity. That is, in the present invention, the pH of the feedwater is not fixed but can be moved upwardly or downwardly depending on what direction results in the highest resistivity in the product water.

In the present invention, it is important that a range of resistivity of product water be used as a set point. Further, as noted, it is important that adjustment in pH be maintained within a controlled range. That is, it is known that a pH change can increase the resistivity of product water. However, too much change in pH towards acidity or basicity can result in poor quality or unacceptable product water. If an increase in pH results in lowering resistivity, then programmable logic controller 34 would respond to lower pH in the feedwater to determine if an increase in resistivity of the product water results. Additional changes in pH can be made in accordance with the invention until the highest resistivity is obtained within a set range. If a range of resistivity is set for product water, then the present invention can be controlled to manipulate the feedwater pH to provide the desired resistivity even with changes in pH values or composition of the initial feedwater.

The feedwater which can be purified to high levels of purity in the present invention can include surface water such as river water and water from reservoirs and lakes, for example. In many instances, it is preferred to soften the feed water prior to introducing it to the first primary reverse osmosis step. Generally, these sources of water contain magnesium, calcium, sodium, potassium, barium, aluminum and strontium cations with the magnesium and calcium usually being present at higher levels, depending on the source. Usually, ground water supplies contain calcium and magnesium as the primary cations and bicarbonate (with associated carbon dioxide) and sulfate as the primary anions. Sodium and chloride levels are usually less than 20 to 25% of the total cation and anion concentrations for ground waters.

Because of the presence of scale forming cations, such as magnesium and calcium, membrane scaling can occur in the primary reverse osmosis module 10. Thus, for purposes of the invention, it is preferred to pretreat the feedwater to remove the scale forming cations. Conventionally, such pretreatments include water softening. However, this has the disadvantage that large quantities of salt are required for regeneration of the softener. Thus, for purposes of the present invention, pretreatment of the feedwater utilizing a softening or nanofiltration membrane is also acceptable. The nanofiltration membrane operates at about ¼ to ⅓ the pressure (e.g., 60 to 120 psig) required for a reverse osmosis membrane used for purifying brackish water. Thus, nanofiltration can be used for pretreatment of the feedwater to remove scale forming precipitates, colloidal and organic material which would operate to foul the primary reverse osmosis membrane. The nanofiltration membrane is effective in removing up to about 80% of the large ionic radius ions and radicals, such as calcium, magnesium, sulfate and to a lesser extent, bicarbonate. Sodium and chloride ions, because of their small ionic radius, are not effectively removed (about 20 to 40% by nanofiltration). Thus, if caustic is used to adjust the pH of the feedwater, water softening. or nanofiltration should be used to remove multivalent cations. The use of nanofiltration as a pretreatment has the advantage over conventional softening of not requiring the use of large quantities of regenerant salt or the disposal of regenerant waste solutions. Further, the use of nanofiltration as a pretreatment has the advantage that fouled nanofiltration membranes are much easier to clean when compared to conventional reverse osmosis membranes.

Nanofiltration membranes useful in the present invention are available from Filmtec, A division of Dow Chemical Company under the designation NF-40 or NF-70. Typically, nanofiltration membranes useful in the invention have a pore size in the range of 0.005 to 0.05 $\mu$m, and preferably 0.008 to 0.02 $\mu$m. In the present invention, nanofiltration is preferred for pretreatment of feedwater having a total dissolved solids of 200 ppm or greater and high percent hardness, e.g., 75% or greater, due to cations such as calcium and magnesium ions. The nanofiltration operates to remove 50 to 80% of the scale-forming precipitates. Thus, nanofiltration operates to reduce both alkalinity or dealkalize the feedwater and to reduce total dissolved solids from the feedwater.

Dealkalization enables feed and interpass pH to be maintained at a lower pH, for a given tap-water feed, than would be the case without dealkalization, and still obtain good product quality. It can be used to maintain second pass feed pH at less than 7 to facilitate rejection of ammonia. Dealkalization can be used for purposes of limiting the upper value of the feed pH control setting and thereby the resulting interpass and product pH and product water alkalinity, particularly in tap-water feeds whose alkalinity tends to be high, or whose alkalinity rises seasonally above a base-line value.

Also, an activated carbon pretreatment may be provided to remove a portion of the naturally occurring materials and residual disinfectant such as chlorine and chloramine compounds which result from the addition of ammonia to water to reduce high trihalomethane levels resulting from chlorination and the reaction of chlorine with organics such as humic acid.

In another method of removing chloramine, sodium bisulfite may be added to the feedwater for purposes of removing chlorine. That is, sodium bisulfite acts to break down chloramine to chloride and ammonia gas. The chloride ion is rejected by the reverse osmosis membrane. The ammonia gas becomes ionized in a pH range of 6 to 7 and will be rejected by the reverse osmosis membrane. Thus, it is preferred that the interpass permeate be maintained at a pH in the range of 6 to 7 in order that the reverse osmosis unit 18 can remove the ammonium ion. The interpass permeate can be maintained at a pH of 6 to 7 by selecting a first pass membrane (reverse osmosis unit 10) that has a high salt rejection which operates to reduce alkalinity to a greater extent in the first pass. This results in a lower pH for the interpass permeate. Also, if the feedwater is partially dealkalized, the pH of the feedwater entering reverse osmosis unit 10 can be lower resulting, in some instances, in a lower pH for the interpass permeate.

Figure 2:
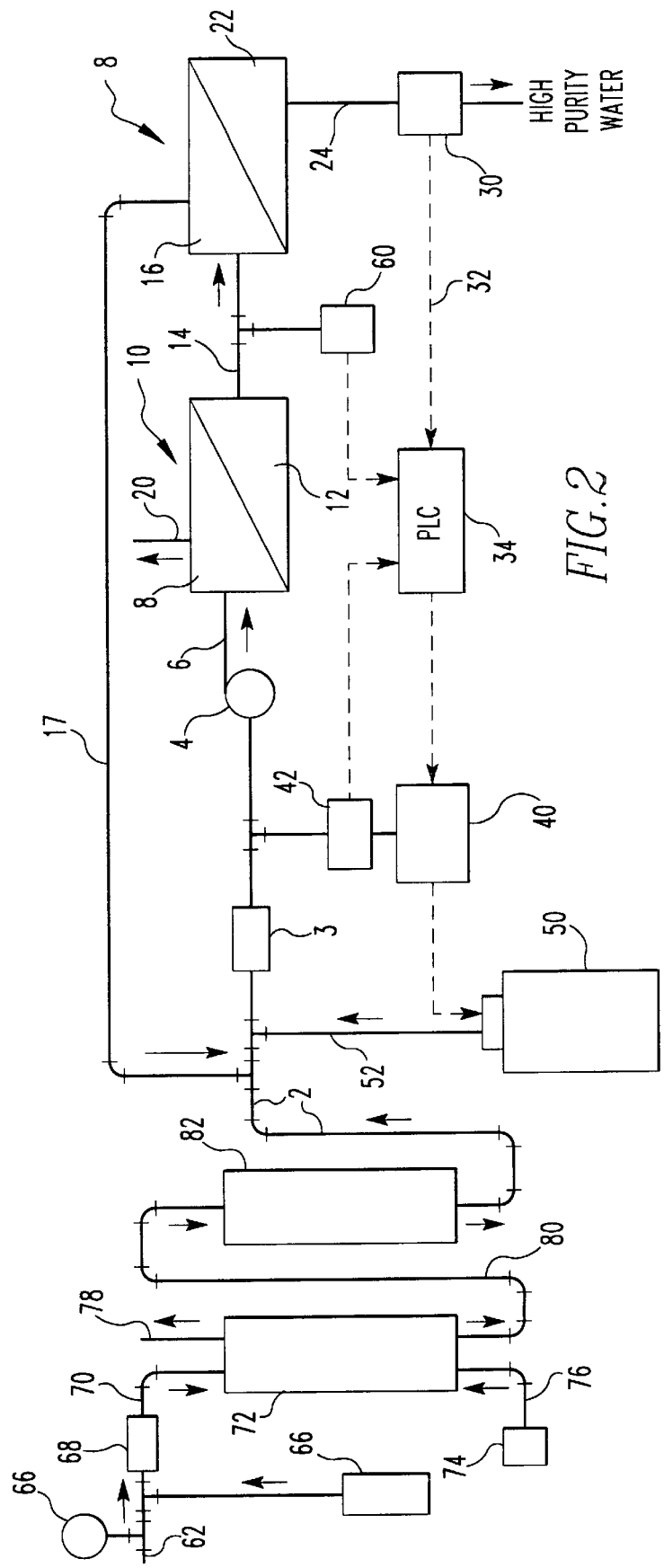
FIG. 2 shows a schematic illustrating pretreatment of the feedwater prior to the reverse osmosis treatments.
Figure 3:
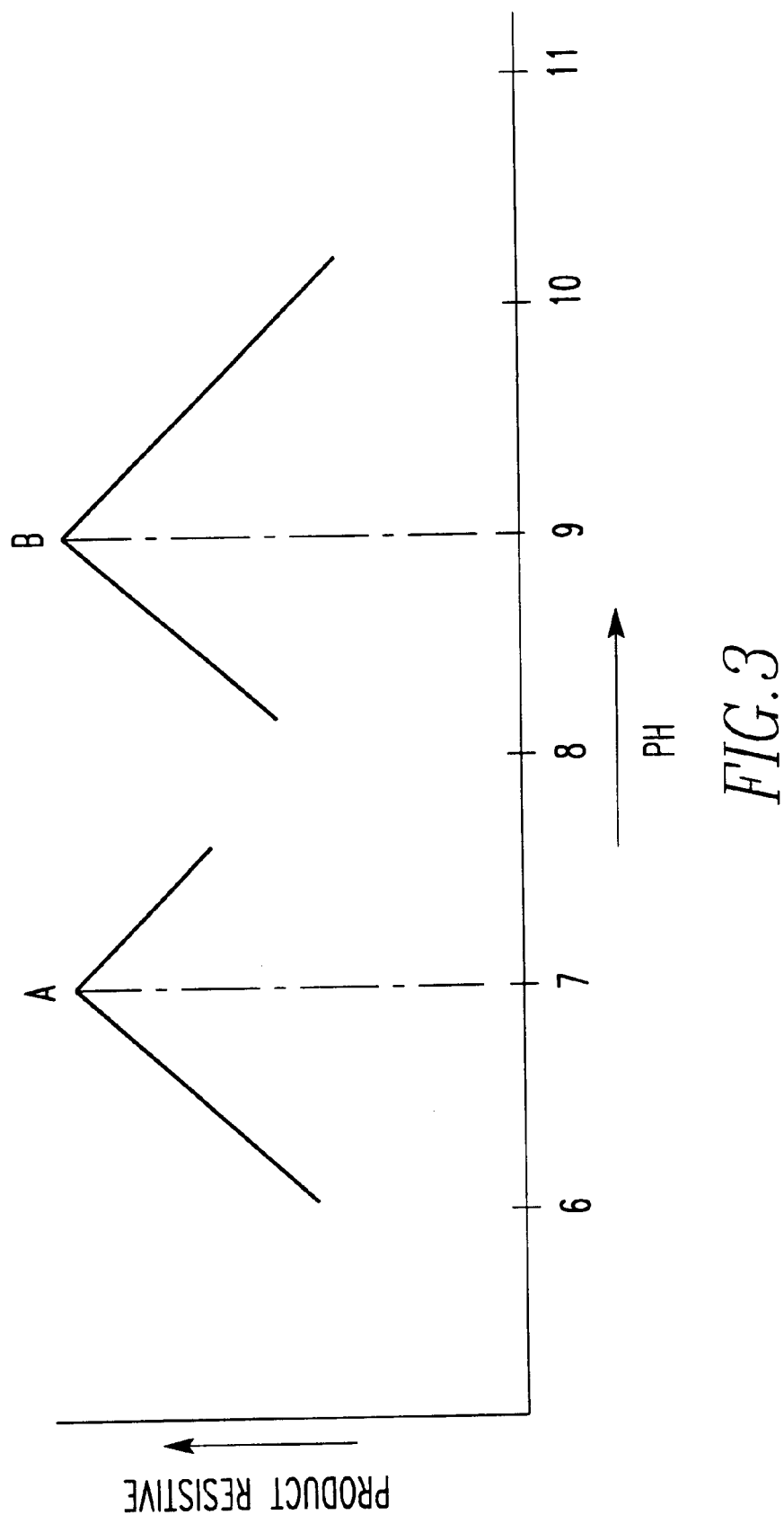
FIG. 3 is a schematic illustrating that different pH values can produce equivalent resistivity product water.

In FIG. 2 there is shown a schematic illustrating the process of dealkalizing, degassing and/or softening the feedwater prior to pH adjusting for introducing to first reverse osmosis unit 10. Feedwater is introduced at line 62 and an alkalinity monitor 64 is provided to determine the total alkalinity of the feedwater. A signal is relayed from alkalinity monitor to acid tank 66 which injects a controlled amount of acid, e.g., sulfuric acid, to lower the total alkalinity of the feedwater. Typically, the feedwater should be dealkalized when alkalinity is greater than 200 mg/l based on $CaCO_3$. After the injection of acid, a mixer 68 disperses the acid in the feedwater.

The dealkalized feedwater is conveyed along line 70 to degassing station or unit 72 for removing carbon dioxide.

The feedwater is degassed by providing a vacuum on one side of a microporous, hydrophobic membrane such as is available from HoeschtCelanese under the trade name Liqui-Cel®. The degassing may be accomplished using a vacuum and a gas purge using nitrogen or air. In degassing unit 72, 80% and preferably 90% of the free carbon dioxide is removed. The vacuum is obtained by blowing air, using blower 74, through line 76. The air exits along line 78. Degassed feedwater is removed along line 80 to water softener 82. The pH of the feedwater can be lowered prior to its entering degassing unit 72 to favor removal of carbon dioxide gas. pH of feedwater in the range of 8 to 10 is useful for the present invention.

After water softener 82, the pretreated feedwater is introduced along line 2 to static mixer 3 and pump 4, as noted earlier, before being introduced to reverse osmosis unit 10.

In the present invention, alkalinity in the feedwater resulting from bicarbonate, carbonate and minor amounts of other ions as well as carbon dioxide significantly affect rejection of salts and thus the level of conductivity or resistivity of the product water from a double pass reverse osmosis system. The presence of alkalinity and carbon dioxide result in poorer quality product water than would normally be predicted from rejection of sodium chloride only. Dissolved gases such as carbon dioxide pass through a reverse osmosis membrane while most of the alkaline material is rejected. This causes a drop in the pH of permeate from the first reverse osmosis by changing the alkalinity:carbon dioxide ratio. Thus, it will be seen that such change in pH in respect of interpass permeate may not be optimum for production of product water having a high resistivity. However, by monitoring product water resistivity in accordance with the invention, the feedwater can be adjusted to provide an interpass permeate having a pH in the range of 6 to 7.5 which permits production of product water having high resistivity. That is, at a pH in the range of 6 to 7, the ammonia gas becomes ionized and is easily rejected in reverse osmosis unit 18. Thus, it is preferred to adjust the pH of the interpass permeate by adjusting the alkalinity of the feedwater. The interpass permeate can be degassed or treated with acid to remove or directly ionize ammonia gas. The interpass permeate pH can be adjusted also with alkali or base material, buffer, a natural or synthetic material such as resin or zeolite, an electro or electrochemical ion exchange process. Also, the interpass permeate can be degassed using a hydrophobic membrane where a vacuum is provided on one side to remove gases through the membrane. However, often this is not a preferred method.

In the present invention, preferably the pH of the feedwater to reverse osmosis 10 is maintained in the range of 8 to 10 with a preferred range being about 8 to 9.5. As noted, the pH of the feedwater can be adjusted by injecting a solution of caustic material from tank 50 along line 52 into line 2. This level of pH has the effect of ionizing residual carbon dioxide to facilitate its remove in first pass reverse osmosis 10.

Further, in the present invention, it is preferred that the pH of the permeate from reverse osmosis 10 is maintained in the range of about 6.5 to 7.5. Normally, a pH below 8 will result in undesirable levels of carbon dioxide in the interpass water from reverse osmosis 10, and thus high resistivity cannot be obtained. It will be appreciated that these are general guidelines. In the present invention, the resistivity of product water determines the range of pH of the feedwater which may be moved up or down depending on resistivity and direction by the programmable logic controller.

While caustic soda has been noted for pH adjustment, it will be appreciated that other bases that may be used include potassium hydroxide, sodium bicarbonate and sodium carbonate.

After the pH of the pretreated feedwater is adjusted, it is introduced to high pressure side 8 of reverse osmosis 10 where ionized material, such as sodium, chloride, sulfate, bicarbonate and silica, as well as other ions, are rejected and removed along line 10. As noted earlier, the alkalinity:carbon dioxide ratio is changed in reverse osmosis 10, and this causes a drop in pH for the interpass permeate. Thus, it is important that the pH of the interpass permeate is changed in the direction which results in removal of ammonium ions and in optimum resistivity of product water.

Suitable membranes that can be utilized in reverse osmosis units 10 and 18 are available from Fluid Systems Inc. under the designation HRRX.

In another aspect of the invention, it has been found that it can be advantageous to monitor pH of the interpass permeate as well as or instead of the resistivity of the product water. That is, if the composition of the feedwater changes quickly, measuring resistivity of the product water in some cases may not be sufficiently responsive to ensure continued production of high quality product water. When the composition of the feedwater changes quickly, measuring pH of interpass permeate permits a faster response time for changing feedwater pH for introduction to reverse osmosis unit 10. This, in turn, permits continued production of high quality or resistivity product water. The pH of interpass permeate can be determined by pH monitor 60 (FIG. 1). The interpass permeate pH can be relayed to programmable logic controller 34 which in turn determines the necessary change in feedwater pH as noted earlier with respect to product water resistivity. In this way, programmable logic controller 34 can be more responsive to changes in feedwater composition changes.

The pH control function for the interpass permeate can be located within the programmable logic controller as code or it can be provided as a separate instrument.

The pH measurement of the interpass permeate can be difficult because the water has low conductivity (e.g., 10–30 micro-S-cm) and the pressure of the interpass is variable. Thus, a bleed off stream can be used which avoids contaminating the water. Also, a pressure-compensated pH reference electrode probe holder can be used. The pH measurement of the interpass permeate can either be an absolute pH value or it can be a change in pH to indicate the direction of change of the pH as the interpass permeate flows past the electrode. Alternatively, flow can be stopped in the bleed line and absolute values of pH obtained.

While reverse osmosis units 10 and 20 have been shown as single units, they can be comprised of multiple units in series or parallel with the retentate of the later reverse osmosis transferred back to feed of the earlier reverse osmosis unit.

Thus, in the present invention, product water resistivity is monitored and used to reset the set-point of a feedwater pH controller to increase or decrease pH of feedwater introduced to reverse osmosis unit 10. As noted, this changes the interpass permeate pH. Further, as explained, performance of both reverse osmosis units 10 and 18 changes with changes in feedwater composition. The first pass through reverse osmosis unit 10 changes in a complex manner. Thus, the present invention adjusts the composition of the feedwater in response to the resistivity of the product water leaving reverse osmosis unit 18. For example, feedwater pH is increased or decreased at discrete intervals in the direction which results in highest resistivity product water.

This process has the advantage that it can be fully automated. This results in less operator attention being required and in a more consistent quality of product water.

While the invention has been described with respect to an automated control system, it will be appreciated that the system can be operated on a semi-automated mode. That is, the pH of the feedwater can be adjusted manually in response to electrical resistance measurements of the product water. Such semi-automated mode is contemplated within the scope of the invention.

EXAMPLE

Figure 4:
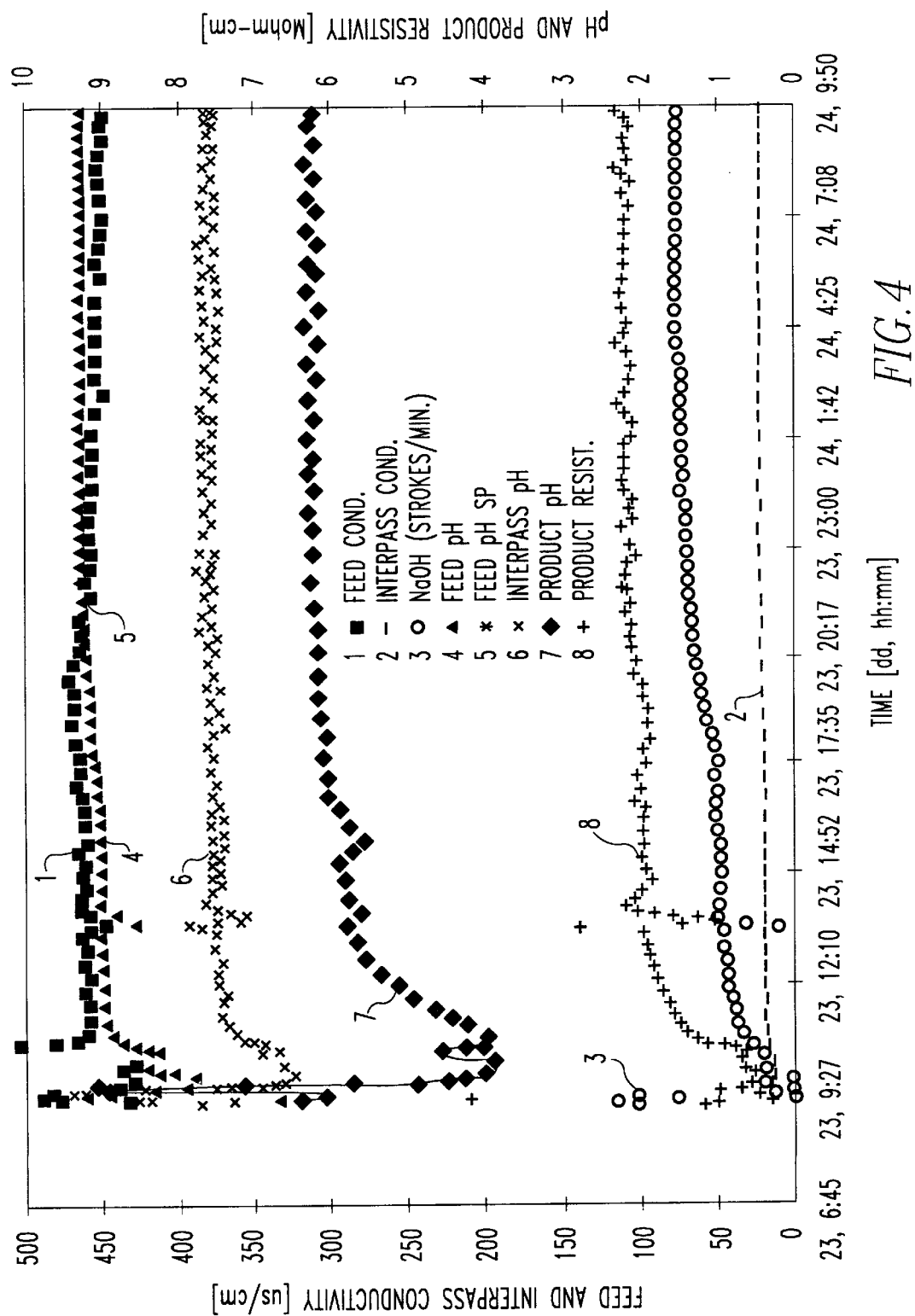
FIG. 4 shows that product water having a resistivity of about 2 megohm-cm can be produced on a continuous basis using the adaptive control system of the invention which changes feed pH in response to product water resistivity.

A tap water feed was purified continuously in a double pass reverse osmosis substantially as shown in FIG. 1. The tap water had a conductivity of 330 micro-S-cm, a total alkalinity of 89 (as $CaCO_3$) mg/l and a pH of 7.9 with a total hardness of 92.5 (as $CaCO_3$) mg/l. The tap water feed was pretreated by softening and subjected to a 5 micron cartridge filtration, prior to adjusting the pH to about 9.24. The feed to the first reverse osmosis had a conductivity of 450 micro-S-cm, a total alkalinity of 159 (as $CaCO_3$) mg/l and a total hardness (as $CaCO_3$) of <1 mg/l after stabilized flow was established. The interpass or permeate from the first reverse osmosis had a conductivity of about 20 micro-S-cm, a pH of about 7.6 and a total hardness (as $CaCO_3$) of about 0 mg/l after stabilized flow was established. The product water produced had a conductivity of 0.45 micro-S-cm, total alkalinity (as $CaCO_3$) of less than 1 mg/l and a pH of 6.3. The pH adjustment of the feedwater was made upwardly using a caustic soda solution. The caustic additions were made in response to the resistivity of the product water using a PID pH controller function located with the programmable logic controller. This control system maintained product quality at about 2.2 megohm-cm by adjusting the set point of the feed pH controller upwards from about 9.24 to 9.28. This caused the caustic dose to increase by about 18% above the original value. The system was operated continuously for about 24 hours. The results of this run are shown in FIG. 4. It will be seen that product water having a resistivity of about 2 megohm-cm could be produced on a continuous basis using the adaptive control system of the invention.

While the invention has been described in terms of preferred embodiments, the claims appended hereto are intended to encompass other embodiments which fall within the spirit of the invention.

What is claimed is:

1. A control method for producing high purity product water using resistivity of product water, the method having the ability to produce high purity product water having a resistivity in the range of 0.8 to 4 megohm-cm, the method comprising the steps of:

(a) providing a feedwater to be purified;
   (b) providing a first reverse osmosis unit having a first high pressure side and a first low pressure side and having a first permeate produced at said first low pressure side;
   (c) monitoring the pH of said feedwater to be introduced to the high pressure of said first reverse osmosis unit;
   (d) introducing said feedwater maintained at a temperature in a range of 40° to 95° F. to the high pressure side of said first reverse osmosis unit;
   (e) providing a second reverse osmosis unit having a second high pressure side and a second low pressure side for producing high purity product water;
   (f) passing the first permeate from the first reverse osmosis to the high pressure side of said second reverse osmosis;
   (g) monitoring the resistance of said product water produced at said second low pressure side of said second reverse osmosis to provide a resistance measurement;
   (h) relaying said resistance measurement to a programmable logic controller;
   (i) in said programmable logic controller, comparing said resistance measurement with a previous resistance measurement to provide a comparison; and
   (j) in response to said comparison, maintaining or changing the pH of said feedwater upwardly or downwardly to produce said high purity water having said desired resistivity.

2. The method in accordance with claim 1 including the step of subjecting said feedwater to a nanofiltration step prior to adjusting said pH.

3. The method in accordance with claim 1 including the step of subjecting said feedwater to a de-alkalization step prior to adjusting said pH.

4. The method in accordance with claim 1 including the step of subjecting said feedwater to a degassing step to remove carbon dioxide gas.

5. The method in accordance with claim 1 including the step of maintaining said product water at a resistivity of at least 0.8 megohm-cm.

6. The method in accordance with claim 1 including the step of maintaining said product water at a resistivity in the range of 0.8 to 8 megohm-cm.

7. The method in accordance with claim 1 including adjusting said pH of said feedwater upwardly in response to a resistance measurement to increase the resistance measurement.

8. The method in accordance with claim 1 including providing a resistance measurement range for said product water in said programmable logic controller, and in response to said resistance measurement, changing the pH of said feedwater to maintain said resistance measurement of said product water in said resistance measurement range.

9. The method in accordance with claim 1 including measuring pH change of said first permeate and relaying said pH change to said programmable logic controller and in response to said pH change maintaining or changing the pH of said feedwater to provide high purity water having a resistivity of at least 0.8 megohmn-cm.

10. The method in accordance with claim 1 including the step of maintaining said feedwater to be introduced to said first reverse osmosis in a temperature range of 66 to 78° F.

11. The method in accordance with claim 1 including the step of maintaining said feedwater in a pH range of 8 to 10 and maintaining said first permeate in a pH range of 6 to 7.

12. The method in accordance with claim 1 including the step of maintaining said feedwater in a pH range of 7 to 9 and maintaining said first permeate in a pH range of 9 to 9.5.

13. The method in accordance with claim 1 including measuring the pH of said first permeate, relaying said pH to said programmable logic controller and in response to said pH, maintaining or changing the pH of said feedwater to maintain the pH of said permeate in a pH range of 6 to 7.5.

14. The method in accordance with claim 1 including the step of maintaining said first permeate in a pH range of 6 to 7.

15. The method in accordance with claim 1 including measuring the pH of said first permeate, relaying said pH to said programmable logic controller and in response to said pH, maintaining or changing the pH of said feedwater to maintain the pH of said permeate in a pH range of 6 to 7.5.

16. A control method for producing high purity product water on a continuous basis, the method having the ability to produce high purity product water having a resistivity in the range of 0.8 to 4 megohm-cm, the method comprising the steps of:

(a) providing a feedwater to be purified;

(b) subjecting the feedwater to at least one of softening or a nanofiltration treatment to provide pretreated feedwater;

(c) providing a first reverse osmosis unit having a first high pressure side and first low pressure side and having a first permeate produced at said first low pressure side;

(d) monitoring the pH of said feedwater after the nanofiltration or softening treatment prior to introducing the feedwater to the high pressure of said first reverse osmosis unit and maintaining said pretreated feedwater in a pH range of 8 to 9.5;

(e) introducing said feedwater maintained at a temperature in a range of 40° to 95° F. to the high pressure side of said first reverse osmosis unit;

(f) providing a second reverse osmosis unit having a second high pressure side and a second low pressure side for producing high purity product water;

(g) passing the first permeate from the first reverse osmosis unit to the high pressure side of said second reverse osmosis unit;

(h) measuring at least one of pH of said first permeate and electrical resistance of said product water produced at said second low pressure side of said second reverse osmosis unit to provide a measurement;

(i) relaying said measurement to a programmable logic controller;

(j) in said programmable logic controller, comparing said measurement with a previous measurement to provide a comparison; and (k) in response to said comparison, maintaining or changing the pH of said feedwater upwardly or downwardly to produce said high purity water having said desired resistivity.

17. The method in accordance with claim 16 wherein said measurement is an electrical resistance measurement.

18. The method in accordance with claim 16 wherein said measurement is a pH measurement.

19. The method in accordance with claim 16 including the step of subjecting said feedwater to a de-alkalization step prior to adjusting said pH.

20. The method in accordance with claim 16 including the step of subjecting said feedwater to a degassing step to remove carbon dioxide gas.

21. The method in accordance with claim 16 including the step of maintaining said product water at a resistivity of at least 0.8 megohm-cm.

22. The method in accordance with claim 16 including the step of maintaining said product water at a resistivity in the range of 0.8 to 8 megohm-cm.

23. The method in accordance with claim 16 including adjusting said pH of said feedwater upwardly in response to a measurement to increase the resistance measurement.

24. The method in accordance with claim 16 including degassing said interpass permeate.

25. The method in accordance with claim 16 including providing a resistance measurement range for said product water in said programmable logic controller, and in response to said resistance measurement, changing the pH of said feedwater to maintain said resistance measurement of said product water in said resistance measurement range.

26. The method in accordance with claim 16 including measuring pH change of said first permeate and relaying said pH change to said programmable logic controller and in response to said pH change maintaining or changing the pH of said feedwater to provide high purity water having a resistivity of at least 0.8 megohm-cm.

27. The method in accordance with claim 16 including the step of maintaining said feedwater to be introduced to said first reverse osmosis in a temperature range of 60 to 78° F.

28. The method in accordance with claim 16 including the step of maintaining said feedwater in a pH range of 8 to 10.

29. A control method for producing high purity product water on a continuous basis using resistivity of product water, the method having the ability to produce high purity product water having a resistivity in the range of 0.8 to 8 megohm-cm, the method comprising the steps of:

(a) providing a feedwater to be purified;

(b) providing a first reverse osmosis unit having a first high pressure side and a first low pressure side and having a first premeate produced at said first low pressure side;

(c) monitoring the pH of said feedwater to be introduced to the high pressure of said first reverse osmosis unit and relaying said pH to a programmable logic controller;

(d) introducing said feedwater maintained at a temperature in a range of 40° to 95° F. to the high pressure side of said first reverse osmosis unit;

(e) providing a second reverse osmosis unit having a second high pressure side and a second low pressure side for producing high purity product water;

(f) passing the first permeate from the first reverse osmosis to the high pressure side of said second reverse osmosis;

(g) measuring the resistance of said product water produced at said second pressure side of said second reverse osmosis on a continuous basis to provide resistance measurements;

(h) relaying said resistance measurements on a continuous basis to said programmable logic controller;

(i) in said programmable logic controller, comparing said resistance measurements with a previous resistance measurement to provide a comparison; and (j) in response to said comparison, maintaining or adjusting the pH of said feedwater upwardly or downwardly to produce said high purity water having a resistivity in a range of 0.4 to 8 megohm-cm.

30. A control method for producing high purity product water on a continuous basis, the method having the ability to produce high purity product water having a resistivity in the range of 0.8 to 8 megohm-cm, the method comprising the steps of:

(a) providing a feedwater to be purified;

(b) subjecting the feedwater to a nanofiltration or softening treatment to provide pretreated feedwater;

(c) providing a first reverse osmosis unit having a first high pressure side and a first low pressure side and having a first permeate produced at said first low pressure side;

(d) mononitoring the pH of said feedwater after the nanofiltration or softening treatment prior to introducing the feedwater to the high pressure of said first reverse osmosis unit and relaying said pH to a programmable logic controller;

(e) maintaining said pretreated feedwater in a pH range of 8 to 10;

(f) introducing said pretreated feedwater maintained at a temperature in a range of 40° to 95° F. to the high pressure side of said first reverse osmosis unit to provide said first permeate;

(g) monitoring the pH of said first permeate and relaying pH of said first permeate to said programmable logic controller;

(h) providing a second reverse osmosis unit having a second high pressure side and a second low pressure side for producing high purity product water;

(i) in said programmable logic controller, comparing the pH of said first permeate to a pH range for said first permeate;

(j) in response to comparing said pH of said first permeate, maintaining or adjusting the pH of the feedwater upwardly or downwardly to maintain said pH of said first permeate in said pH range; and (k) passing the first permeate from the first reverse osmosis unit to the high pressure side of said second reverse osmosis unit to provide said high purity water having said desired resistivity.

* * * * *